United States Patent
Sharma et al.

(10) Patent No.: US 12,010,171 B2
(45) Date of Patent: *Jun. 11, 2024

(54) DOMAIN-BASED RAFT CONSENSUS SELECTION OF LEADER NODES IN DISTRIBUTED DATA SERVICES

(71) Applicant: Bank of America Corporation, Charlotte, NC (US)

(72) Inventors: Yash Sharma, Delhi (IN); Sandeep Kumar Chauhan, Miyapur (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,890

(22) Filed: Apr. 18, 2023

(65) Prior Publication Data
US 2023/0269294 A1   Aug. 24, 2023

Related U.S. Application Data

(63) Continuation of application No. 17/679,838, filed on Feb. 24, 2022, now Pat. No. 11,671,488.

(51) Int. Cl.
| | |
|---|---|
| *H04L 12/00* | (2006.01) |
| *G06F 11/34* | (2006.01) |
| *G06F 16/27* | (2019.01) |
| *H04L 67/104* | (2022.01) |
| *H04L 67/1074* | (2022.01) |

(52) U.S. Cl.
CPC ...... *H04L 67/1051* (2013.01); *G06F 11/3409* (2013.01); *G06F 16/27* (2019.01); *H04L 67/1085* (2013.01)

(58) Field of Classification Search
CPC ............. H04L 67/1051; H04L 67/1085; H04L 67/1095; G06F 11/3409; G06F 16/182; G06F 16/27
USPC .................................................. 709/222–224
See application file for complete search history.

(56) References Cited

U.S. PATENT DOCUMENTS

| | | | |
|---|---|---|---|
| 9,047,331 B2* | 6/2015 | Rao .......................... | G06F 16/27 |
| 10,542,049 B2* | 1/2020 | Cui ......................... | H04L 63/029 |
| 10,749,951 B2* | 8/2020 | Matican ................ | G06F 9/5077 |
| 10,802,869 B2* | 10/2020 | Yang ...................... | G06F 11/187 |

(Continued)

FOREIGN PATENT DOCUMENTS

WO   2021121030 A1   6/2021

*Primary Examiner* — Frantz Coby
(74) *Attorney, Agent, or Firm* — Banner & Witcoff, Ltd.

(57) ABSTRACT

Domain-based server-selection computer-implemented processes and machines implement an extension of RAFT consensus for leader selection based on patterns of update data proximity. Accounts involved in payment or other transactions are maintained as "sharded" data across data store instances that are split into shards according to their temporal activity. If the domain attributes for a node exceed a threshold and are greater than the other nodes, the node is designated as a leader node and the others are designated as follower nodes. This provides an additional optimization in network performance by introducing insights in normal operations within a domain in a distributed network. If the domain attributes do not exceed the threshold and/or are not greater than the other nodes, a traditional consensus algorithm is used to select leader and follower nodes.

20 Claims, 6 Drawing Sheets

(56) References Cited

U.S. PATENT DOCUMENTS

| | | |
|---|---|---|
| 10,848,375 B2 | 11/2020 | Han et al. |
| 11,096,116 B2 * | 8/2021 | Crouthamel ...... H04W 56/0015 |
| 11,626,993 B2 * | 4/2023 | Zamani .............. H04L 41/0893 |
| | | 713/168 |
| 11,671,488 B1 * | 6/2023 | Sharma ................ G06F 16/182 |
| | | 709/223 |
| 2015/0092530 A1 | 4/2015 | Kelsey et al. |
| 2015/0186229 A1 * | 7/2015 | Bortnikov .............. H04L 69/40 |
| | | 714/4.11 |
| 2016/0224949 A1 | 8/2016 | Thomas et al. |
| 2019/0235905 A1 | 8/2019 | Fried-Gintis et al. |
| 2019/0342383 A1 * | 11/2019 | Matican .................. G06F 3/065 |
| 2020/0151006 A1 | 5/2020 | Kancharla et al. |
| 2020/0204351 A1 | 6/2020 | Chen et al. |
| 2020/0211007 A1 | 7/2020 | Li |
| 2020/0260655 A1 | 8/2020 | Sappenfield |
| 2022/0206900 A1 | 6/2022 | Zad Tootaghaj et al. |

\* cited by examiner

FIG. 1 – Traditional Raft Consensus (Prior Art)

DOMAIN-BASED RAFT CONSENSUS SELECTION OF LEADER NODES IN DISTRIBUTED DATA SERVICES

CROSS REFERENCE TO RELATED APPLICATIONS

This application is a continuation of and claims priority to co-pending U.S. application Ser. No. 17/679,838, filed Feb. 24, 2022, and entitled "Domain-Based Raft Consensus Selection of Leader Nodes in Distributed Data Services," which is incorporated herein by reference in its entirety.

TECHNICAL FIELD OF DISCLOSURE

The present disclosure relates to processes and machines for cloud computing and more specifically to selection of leader nodes based on Raft consensus in fault-tolerant distributed data services.

BACKGROUND

Data services refer to implementations designed to provide access (storage and retrieval) to data using data storages. Examples of such data services include databases and file systems. External applications may access desired data elements by interacting with data services according to pre-specified conventions.

Distributed data services refer to implementations which are based on a collection of processing nodes and data storage nodes, often as nodes of a cloud infrastructure. The collection of all such nodes cooperatively provide a unified view of data service interfaces with external applications, while shielding the applications from the underlying storage and processing of data. Distributed data services thus provide for distributed features such as fault tolerance (of nodes or storage), enhanced performance, data redundancy (by a replication factor), etc., as is well known in the relevant arts.

Leader nodes are inherent to the operation of distributed data services. Leader nodes generally provide central essential tasks that would be required as distributed data services are implemented based on various nodes. For example, a large-scale distributed data service may be designed as several cooperating parts, with each part being replicated (distributed) in each node of a group of nodes (hereinafter referred to as "a cluster of nodes" implementing each part) and a leader node in the cluster providing a central essential task for that cluster. One of such central essential tasks is to operate as a point of interface to the external applications for using the service corresponding to the part, which is desirable as the part is replicated among the cluster of nodes. Different processing nodes of a cluster may operate as leader nodes in corresponding durations, while some of the nodes operating as leader nodes for some parts may operate as followers for other parts.

Further, a cluster of nodes may be confined within a single domain. Traditional leader selection of a node within a domain has been based on a consensus algorithm. Consensus involves multiple servers agreeing on values. Once they reach a decision on a value, that decision is final. Typical consensus algorithms make progress when any majority of their servers is available; for example, a cluster of 5 servers can continue to operate even if 2 servers fail. If more servers fail, they stop making progress (but will never return an incorrect result).

Consensus typically arises in the context of replicated state machines, a general approach to building fault-tolerant systems. Each server has a state machine and a log. The state machine is the component that we want to make fault-tolerant, such as a hash table. It will appear to clients that they are interacting with a single, reliable state machine, even if a minority of the servers in the cluster fail. Each state machine takes as input commands from its log. Each state machine processes the same series of commands and thus produces the same series of results and arrives at the same series of states.

The prior art implementation of consensus leader selection algorithms, such as Raft, "within a domain" is not optimal, because individual follower nodes may be very active in that "domain" within certain time periods (in which case they should be the leader) and inactive or less active in that "domain" during other periods (in which case they should be one of the followers). In addition, distributed systems that follow patterns typical to their domains are unable to parameterize generic Raft consensus operations to gain performance. Accordingly, a distributed system following traditional Raft consensus will continue to process transactions with an elected leader that may not be optimal for based on the unique variations in network based on the domain the transactions belong to an improved "domain-based" approach towards leader selection based on activity, demand, and/or other variations "within the domain" or "domain" attributes for various time intervals is needed to overcome this and other problems in the prior art and to provide optimization "within the domain."

SUMMARY

Aspects of this disclosure address one or more of the shortcomings in the industry by, inter alia, implementing an extension of the RAFT consensus for leader selection based on patterns of update data proximity. In various configurations, it is preferred that accounts involved in payment or other transactions are maintained as "sharded" data across data store instances that are split into shards according to their temporal activity. For example, an account may be more active certain times of the day, i.e. can potentially be source or destination of a payment transaction. The sharding may be based on "active" accounts based on time of the day. This provides an additional optimization in network performance by introducing insights in normal operations of a distributed network.

In light of the foregoing background, the following presents a simplified summary of the present disclosure in order to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions of this application are disclosed in the specification throughout this application along with exemplary, non-exhaustive, and non-limiting manners and processes of making and using the inventions, in such full, clear, concise, and exact terms in order to enable skilled artisans to make and use the inventions without undue experimentation and sets forth the best mode contemplated by the inventors for carrying out the inventions.

In accordance with one or more arrangements of the disclosures contained herein, solution(s) provide a domain-based server-selection method. A distributed data service is provided to be operative based on a plurality of nodes in a domain, each of the plurality of nodes having a shard coupled thereto. Data is sharded across data stores coupled to the plurality of nodes. One or more domain attributes (such as temporal activity or other characteristics) are determined for each of said plurality of nodes in the domain based on a pre-determined time interval. If at least one of the domain attributes exceeds a threshold: at least one candidate node is nominated by the plurality of nodes in the domain based on the domain attributes, a leader node from the candidate nodes is elected by the plurality of nodes in the domain based on which of said plurality of nodes has a highest of said domain attributes, each of the plurality of nodes in the domain other than the leader node is designated as follower nodes, the leader node executes leader transactions for a leader shard coupled to the leader node, and the follower nodes execute follower transactions for follower shards coupled to the follower nodes. Alternatively, if none of the domain attributes exceeds the threshold, a traditional consensus selection process is utilized to vote on and select the leader node and designate the follower nodes.

In some arrangements, the domain attributes are based on activity of the plurality of nodes, transaction demands of the plurality of nodes, or variations within the domain.

In some arrangements, a new leader is elected after expiration of a term.

In some arrangements, the distributed data service is distributed database.

In some arrangements, the plurality of nodes include processing nodes and data storage nodes.

In some arrangements, the consensus selection process is a Raft consensus algorithm.

In some arrangements, the leader node replicates its log to the follower nodes.

In some arrangements, the foregoing may be implemented as a domain-based server-selection non-transitory machine-readable medium storing one or more sequences of instructions, wherein execution of said one or more instructions by one or more processors contained in a system causes said system to perform one or more of the foregoing actions.

In some arrangements, the foregoing may be implemented as a domain-based server-selection digital processing system to perform one or more of the foregoing actions.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized and structural and functional modifications may be made. It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable instructions can include one or more: active-learning, algorithms (including pure and hybrid consensus algorithms), applications, application program interfaces (APIs), attachments, big data, daemons, emails, encryptions, databases, datasets, drivers, data structures, file systems or distributed file systems, firmware, graphical user interfaces, images, instructions, machine learning categories (i.e., supervised, semi-supervised, reinforcement, and unsupervised), machine learning algorithms (e.g., bidirectional LSTM, Logistic Regression, XG Boost, Random Forest, etc.), middleware, modules, objects, operating systems, processes, protocols, programs, scripts, tools, and utilities. The computer-executable instructions can be on tangible, computer-readable memory (local, in network-attached storage, remote, or cloud-based), can be stored in volatile or non-volatile memory, and can operate autonomously, on-demand, on a schedule, spontaneously, proactively, and/or reactively.

"Computers" can include one or more: general-purpose or special-purpose network-accessible administrative computers, clusters, computing devices, computing platforms, desktop computers, distributed systems, enterprise computers, laptop or notebook computers, controlling computers, nodes, personal computers, portable electronic devices, servers, controlled computers, smart devices, tablets, and/or workstations, which have one or more microprocessors or executors for executing or accessing the computer-executable software and data. References to computer machines, servers, clients, names of devices, etc. within this definition are used interchangeably in this specification and are not considered limiting or exclusive to only a specific type of device. Instead, references in this disclosure to computers and the like are to be interpreted broadly as understood by skilled artisans. Further, as used in this specification, computers also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing. A computer network includes any transport that supports HTTP.

Figure 1:
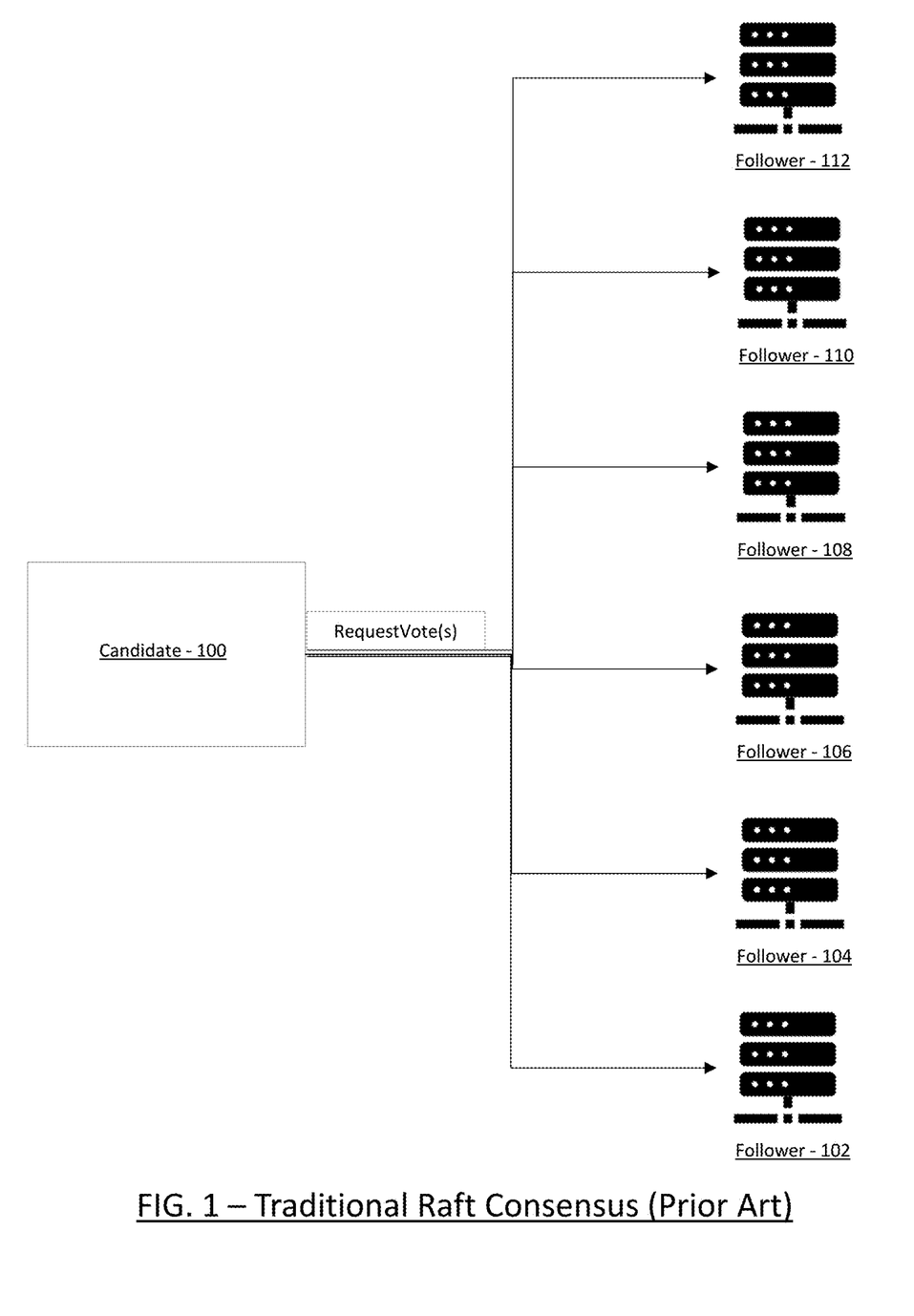
FIG. 1 shows a traditional Raft consensus leader selection process based on requesting votes.

FIG. 1 depicts a traditional Raft consensus implementation for leader selection. At a high level, candidate nodes 100 request votes from the follower nodes 102, 104, 106, 108, 110, and 112. Essentially, Raft achieves consensus via an elected leader. A server in a raft cluster is either a leader or a follower and can be a candidate in the precise case of an election (leader unavailable). The leader is responsible for log replication to the followers. It regularly informs the followers of its existence by sending a heartbeat message. Each follower has a timeout (typically between 150 and 300 ms) in which it expects the heartbeat from the leader. The timeout is reset on receiving the heartbeat. If no heartbeat is received the follower changes its status to candidate and starts a leader election.

FIG. 1 depicts a traditional Raft consensus implementation for leader selection. At a high level, candidate nodes 100 request votes from the follower nodes 102, 104, 106, 108, 110, and 112. Essentially, Raft achieves consensus via an elected leader. A server in a raft cluster is either a leader or a follower and can be a candidate in the precise case of an election (leader unavailable). The leader is responsible for log replication to the followers. It regularly informs the followers of its existence by sending a heartbeat message. Each follower has a timeout (typically between 150 and 300 ms) in which it expects the heartbeat from the leader. The timeout is reset on receiving the heartbeat. If no heartbeat is received the follower changes its status to candidate and starts a leader election.

Traditionally, when the existing leader fails or when the algorithm initializes, a new leader needs to be elected. In this case, a new term starts in the cluster. A term is an arbitrary period of time on the server for which a new leader needs to be elected. Each term starts with a leader election. If the election is completed successfully (i.e. a single leader is elected) the term keeps going with normal operations orchestrated by the new leader. If the election is a failure, a new term starts, with a new election.

In the prior art, a leader election is started by a candidate server. A server becomes a candidate if it receives no communication by the leader over a period called the election timeout, so it assumes there is no acting leader anymore. It starts the election by increasing the term counter, voting for itself as new leader, and sending a message to all other servers requesting their vote. A server will vote only once per term, on a first-come-first-served basis. If a candidate receives a message from another server with a term number larger than the candidate's current term, then the candidate's election is defeated and the candidate changes into a follower and recognizes the leader as legitimate. If a candidate receives a majority of votes, then it becomes the new leader. If neither happens, e.g., because of a split vote, then a new term starts, and a new election begins.

Raft uses a randomized election timeout to ensure that split vote problems are resolved quickly. This should reduce the chance of a split vote because servers won't become candidates at the same time: a single server will time out, win the election, then become leader and send heartbeat messages to other servers before any of the followers can become candidates.

The leader is responsible for the log replication. It accepts client requests. Each client request consists of a command to be executed by the replicated state machines in the cluster. After being appended to the leader's log as a new entry, each of the requests is forwarded to the followers as AppendEntries messages. In case of unavailability of the followers, the leader retries AppendEntries messages indefinitely, until the log entry is eventually stored by all of the followers.

Once the leader receives confirmation from the majority of its followers that the entry has been replicated, the leader applies the entry to its local state machine, and the request is considered committed. This event also commits all previous entries in the leader's log. Once a follower learns that a log entry is committed, it applies the entry to its local state machine. This ensures consistency of the logs between all the servers through the cluster, ensuring that the safety rule of Log Matching is respected.

In the case of a leader crash, the logs can be left inconsistent, with some logs from the old leader not being fully replicated through the cluster. The new leader will then handle inconsistency by forcing the followers to duplicate its own log. To do so, for each of its followers, the leader will compare its log with the log from the follower, find the last entry where they agree, then delete all the entries coming after this critical entry in the follower log and replace it with its own log entries. This mechanism will restore log consistency in a cluster subject to failures.

Raft guarantees various safety properties. First, Raft provides election safety. At most one leader can be elected in a term. Second, Raft restricts the leader's ability to append-only. A leader can only append new entries to its logs (it can neither overwrite nor delete entries). Third, Raft ensures log matching. If two logs contain an entry with the same index and term, then the logs are identical in all entries up through the index. Fourth, ensures leader completeness in that if a log entry is committed in a term then it will be present in the logs of the leaders since this term. State machine safety is also provided. If a server has applied a particular log entry to its state machine, then no other server may apply a different command for the same log. The first four rules are guaranteed by the details of the traditional Raft consensus algorithm. The state machine safety is guaranteed by a restriction on the election process.

Timing is critical in Raft to elect and maintain a steady leader over time, to have a perfect availability of the cluster. Stability is ensured by respecting the timing requirement of the algorithm: broadcastTime<<electionTimeout<<MTBF, in which broadcastTime is the average time it takes a server to send a request to every server in the cluster and receive responses. It is relative to the infrastructure used. MTBF (Mean Time Between Failures) is the average time between failures for a server. It is also relative to the infrastructure. electionTimeout is the same as described in the Leader Election section. It is something the programmer must choose in traditional prior-art Raft. Typical numbers for these values can be 0.5 ms to 20 ms for broadcastTime, which implies that the programmer sets the electionTimeout somewhere between 10 ms and 500 ms. It can take several weeks or months between single server failures, which means the values are sufficient for a stable cluster.

One or more personal data discovery, artificial-intelligence, virtual or physical machines, applications, and/or instances 100 may include one or more processors 100A, one or more data or communication buses 100B, one or more wired or wireless network interfaces 100C, various input devices or interfaces 100D, and one or more displays 100E, as well as one or more memories that may contain various software or data modules 100F.

Memor(ies)/module(s) 100F, may be volatile or non-volatile, and may include computer instructions, software, and/or data such as, for example, one or more program modules having instructions that when executed by processor(s) 100A cause machine(s), application(s), or instance(s) to perform one or more functions and/or may store or otherwise maintain information which may be used by such program module(s) and/or processor(s) 100A. Sometimes, one or more program modules and/or databases may be stored by and/or maintained in different memory units of a computer machine and/or by different computing devices that may form and/or otherwise make up a collection of computer machines.

The memory or memories 100F for the personal data discovery machine (or the like) and/or applications 100 may include modules and/or data corresponding to Operating System(s)/Virtual Machine(s)/Bot(s) 100-F1, PDD Model Handling/Supervision/Reporting 100-F2, Extracted Metadata/Input Strings/Normalized Input Sequences 100-F3, Artificial Intelligence 100-F4, Bidirectional LSTM (Including LSTM Gates/Units) 100-F5, Natural Language Processing 100-F6, Layer(s)/Associated Storage of Variables (e.g., Preprocessing Layer, Embedding Layer, Supervised Machine Learning Layer, Feed Forward Layer/Dense Layer/Concatenation/Averaging, Output Layer, etc.) 100-F7, and Iterative Model Training/Retraining 100-F7, and Prediction(s) 100-F8.

Machine(s) and/or application(s) 100 may communicate over a local network, wide area network, the Internet, or the like 150 with any number, location, and/or type of Information/Content Sources(s) 102-1 . . . 102-N including, for example, Computers/Servers, Machine Schema, Network Attached Storage, Application Inventories, Structured Data/Metadata, Databases, Spreadsheets, CSV Files, etc. or the like. In particular, machine(s) and/or applications can mount and/or access metadata stored or contained in the foregoing in or corresponding to any type of application or file and can extract some or all such metadata. The extracted metadata can be locally cached and/or stored if desired on machine(s) or in application(s) 100 for processing in accordance with one or more aspects of this invention.

Figure 2:
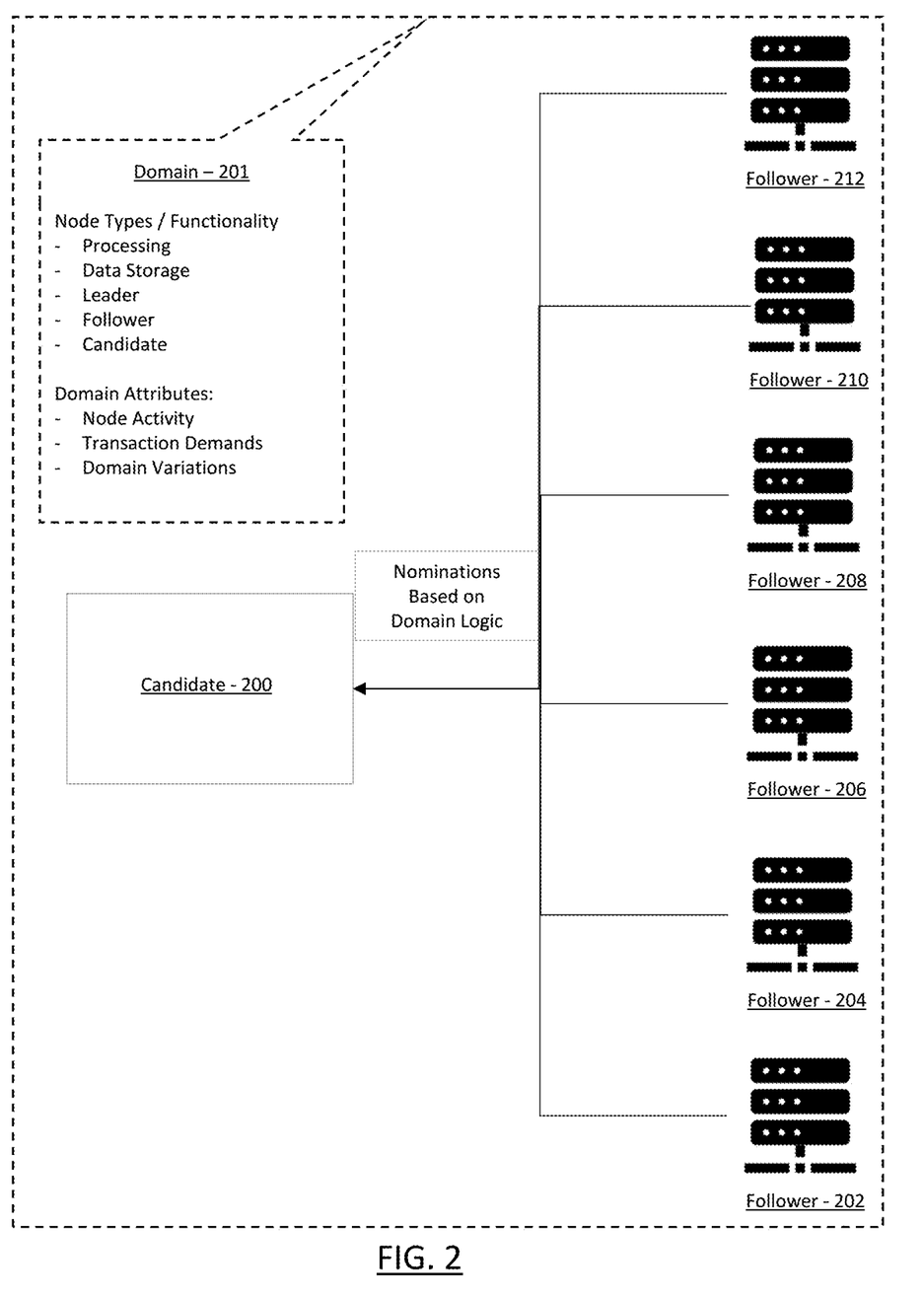
FIG. 2 depicts a domain-based leader-selection process utilizing nominations based on domain logic in accordance with certain aspects of the present disclosure.

By way of non-limited reference and explanation, a generic, sample, structured-data object and/or file 200 from which various metadata can be extracted in accordance with certain aspects of the present disclosure is illustrated in FIG. 2. The sample structured data 200 in FIG. 2 can be in the form of a spreadsheet, CSV file, table, etc. or the like. Structured data 200 may contain any number and/or type of columns 201-1 . . . 201N that do not contain personal information as well as any number and/or type of columns that contain personal information 203 such as social security numbers in this example. Metadata corresponding to the columns of data in the structured object 200 can be located in column headings (or in other locations) 202-1 through 202-N and 204.

In accordance with one or more aspects of this disclosure, a determination and/or prediction can be made of whether structured data 200 contains any personal information by inspection of only the metadata 202-1 . . . 202-N and 204 in the object 200 as opposed to actual inspection of the individual values Value-A . . . Value-I or social security numbers 204-1, 204-2, 204-3, etc. contained therein. This obviates prior art problems such as access right issues and provides dramatically improved analysis and processing.

When the model is deployed, the extracted metadata will be pre-processed and the "COLUMN_NAME" field or the like can be leveraged for model scoring in order to predict which of its values (i.e., the actual column names) are personal data element related; based on the probability threshold or the like that is preselected as desired. Then, the model predictions can be shared for cross-verification. There can be any number of personal data elements and each data element can have its own individual binary classifier if desired. This approach offers flexibility to incorporate new data elements to the modeling efforts in accordance with any new and/or updated privacy laws, rules, or regulations; without affecting the pre-developed individual binary models. In addition, this methodology enables individual personal-data elements scanning; satisfying the needs of different regulations (e.g., Belgium Data Protection Act (BDPA), California Consumer Privacy Act (CCPA), General Data Protection Regulation (GDPR), etc.).

Figure 3:
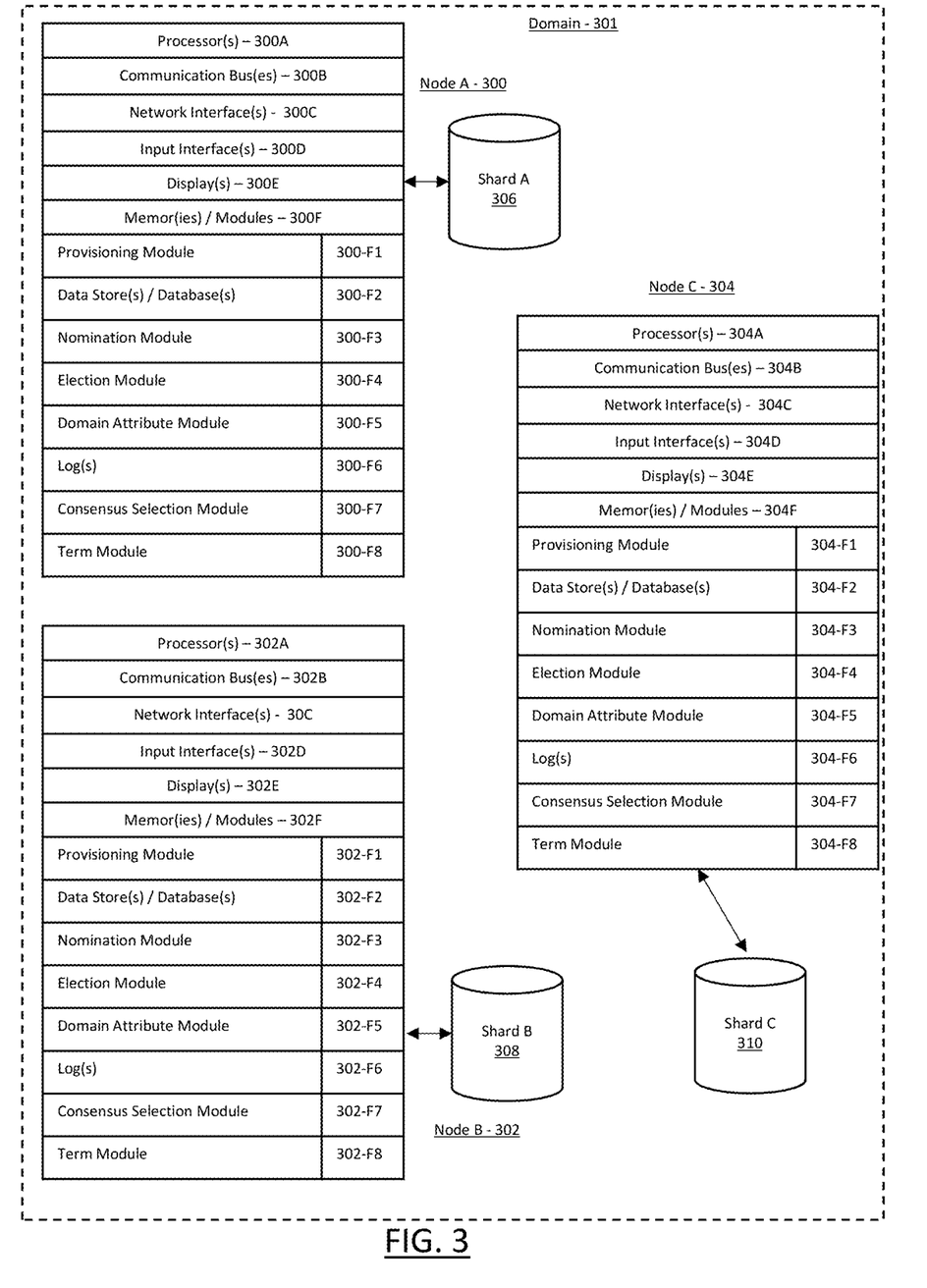
FIG. 3 illustrates sample node and shard hardware and software components for the domain-based selection system and process in accordance with certain aspects of the present disclosure.

FIG. 3 provides a sample artificial-intelligence flow diagram illustrating how certain aspects of the present disclosure may be implemented. An artificial intelligence process can be initiated in S300 on machine(s) or in applications 100. Input can be acquired S302 from Information/Content Sources(s) 102-1 . . . 102-N. This can take the form of mounting, accessing, and then extracting metadata from structured data. It can then be cached, stored, or otherwise situated for handling in accordance with this disclosure.

The extracted metadata can be preprocessed in S302. This can be performed in a preprocessing layer or the like and can include natural language processing or similar functionality in order to create normalized input sequences for analysis. Sample processing can include whitespace stripping and/or case conversion so that each character is of the same case and/or font (e.g., all upper case or all lower case). Other preprocessing can include includes tokenization of one or more names within the metadata field at a character level and conversion of characters in the metadata field into integer indices in order to form a normalized input sequence. Further, the preprocessing can include padding the normalized input sequence if the length is below a threshold (e.g., 50 characters) and truncating the trailing end of the normalized input sequence if the length is greater than the threshold, which will ensure that the normalized input sequences always have the same number of characters contained therein for analysis.

An embedded layer can embed S304 individual characters in the input sequence into fixed-dimension vectors of real numbers in order to generate an embedding matrix. As part of this processing, the padded sequences can be passed as an input to this layer. It can map positive integers (indices of characters) into fixed-dimension vectors of real numbers (embeddings). The embeddings are the parameters (weights) of the neural network which are adjusted during model training to minimize the loss on the 'SSN' identification task. The resulting embedded vectors are representations of characters where similar characters relative to the task are closer to one another in the continuous vector space. The tensor that contains embedding vectors of whole vocabulary is called an "embedding matrix" (M).

Each character index in the padded sequences can be converted to one hot vectors as follows $$\vec{v}_1 = \begin{cases} 1 & \text{if } i \neq char_{ind} \\ 1 & \text{if } i = char_{ind} \end{cases}$$

$\vec{v}_1$—a one hot vector of length vocabulary size (vocab), which contains 1 in the position of character index and 0 otherwise. Output of this layer is computed as follows $$\underset{\text{max\_len} \times \text{dim}}{O} = \underset{\text{max\_len} \times \text{vocab}}{V} \cdot \underset{\text{vocab} \times \text{dim}}{M}$$

In the foregoing, the variable designations are vocab—vocabulary size, max_len—padded sequence length, dim—embedding dimension, V—input matrix that contains one hot encodings for each character in the padded sequence, and M—weight matrix that is optimized during the training.

An active-learning approach and/or supervised machine-learning layer can utilize machine learning S306 on or in conjunction with the embedding matrix in order to generate a machine-learned vector based on the embedding matrix. Preferably, the machine learning used in conjunction with at least some aspects of this disclosure is a bidirectional Long Short Term Memory (LSTM) supervised algorithm performed on a character level; however, any type of supervised, semi-supervised, unsupervised, or other machine learning could be used such as, for example, logistic regression, random forest, XGBoost, etc. If bidirectional LSTM is utilized, one or more LSTM units may be incorporated. Each LSTM unit can include a cell for temporarily storing at least one value over one or more time intervals as well as an input gate, an output gate, and a forget gate in which the gates regulate a flow of information into and out of the cell.

The bidirectional LSTM layer can perform two unidirectional LSTM computations simultaneously—forward and backward. The forward LSTM reads the input from start to the end, and the backward LSTM reads the input from end to the start. The basic block of this layer is an LSTM unit as referenced above.

Mathematical equations for the forward pass of an LSTM unit can be as follows and an input vector can be fed to a LSTM unit at each time stamp:

$x_t \in \mathbb{R}^d$

Forget Gate $f_t = \sigma_g(W_f x_t + U_f h_{t-1} + b_f); f_t \in (0,1)^h$

Input Gate $i_t = \sigma_g(W_i x_t + U_i h_{t-1} + b_i); i_t \in (0,1)^h$

Output Gate $o_t = \sigma_g(W_o x_t + U_o h_{t-1} + b_o); o_t \in (0,1)^h$

Cell Input $\tilde{c}_t = \sigma_c(W_c x_t + U_c h_{t-1} + b_c); \tilde{c}_t \in (-1,1)^h$ Cell State Input $c_t = f_t c_{t-1} + i_t \tilde{c}_t; c_t \in \mathbb{R}^h$ $W \in \mathbb{R}^{h \times d}, U \in \mathbb{R}^d$ and $b \in \mathbb{R}^d$;

Weight matrices and bias vector parameters which need to be learned during training, where the superscripts d and h refer to the number of input features and number of hidden units, respectively.

Vector averaging and/or concatenation can be performed on the machine-vector output S308 and then the probability calculation, multi-node output, two-node binary result, or other output can be provided S310. If additional personal data searches or processing is to be performed S312, additional input can then be acquired in S302 and the personal data discovery can continue; otherwise, the artificial-intelligence process can terminate S314 if desired.

The output or output layer can be a feed-forward neural-network with number of nodes set to number of output classes (e.g., 2, which represents a binary classifier). Result of this layer can denote probability of each class (e.g., SSN/Not SSN).

Figure 4:
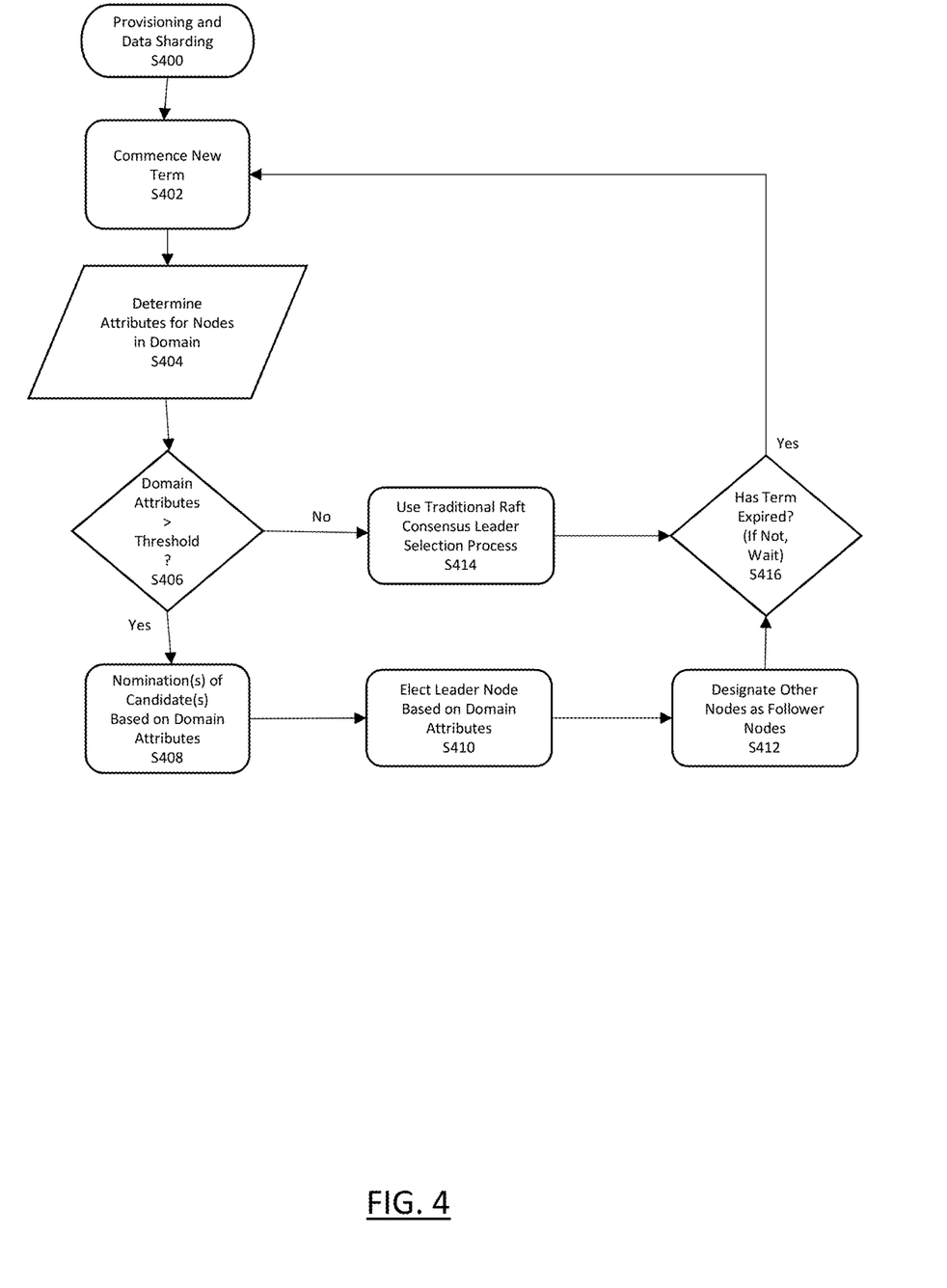
FIG. 4 is a flow diagram illustrating high-level implementation of a domain-based leader selection process in which certain aspects of the present disclosure may be implemented.

FIG. 4 provides additional granular detail and shows lower-level functionality of the artificial intelligence steps shown in the flow diagram of FIG. 3 in which an element-wise averaging is performed in accordance with certain aspects of the present disclosure.

Metadata to be analyzed can be extracted from a data structure. The metadata can be in the form of any type of input string 400 such as, for example, "SSN_TIN." The reference to SSN in the input string could indicate the presence of social security numbers being stored in the column values corresponding to that column-heading metadata. The input string could have a maximum length (e.g., 50 characters) if desired or could be any number of characters if preferred. Individual characters can be embedded into fixed-dimension vectors of real numbers 402 (e.g., having a dimension of 28 or other as desired). Bidirectional LSTM 404 can take the fixed-dimension vectors to perform machine learning thereon in order to generate a temporary output such as one or more machine-learned vectors that could provide output forward contextualization as well as a backward contextualization 406. Individual values in the contextualizations can then be averaged or combined as appropriate 408 into an average with a dimension of 12 or other as desired. The average can then be provided to a softmax activation or other function 410 in order to make a determination or generate probability assessment of whether personal data may be contained within the data values corresponding to the analyzed metadata.

Figure 5:
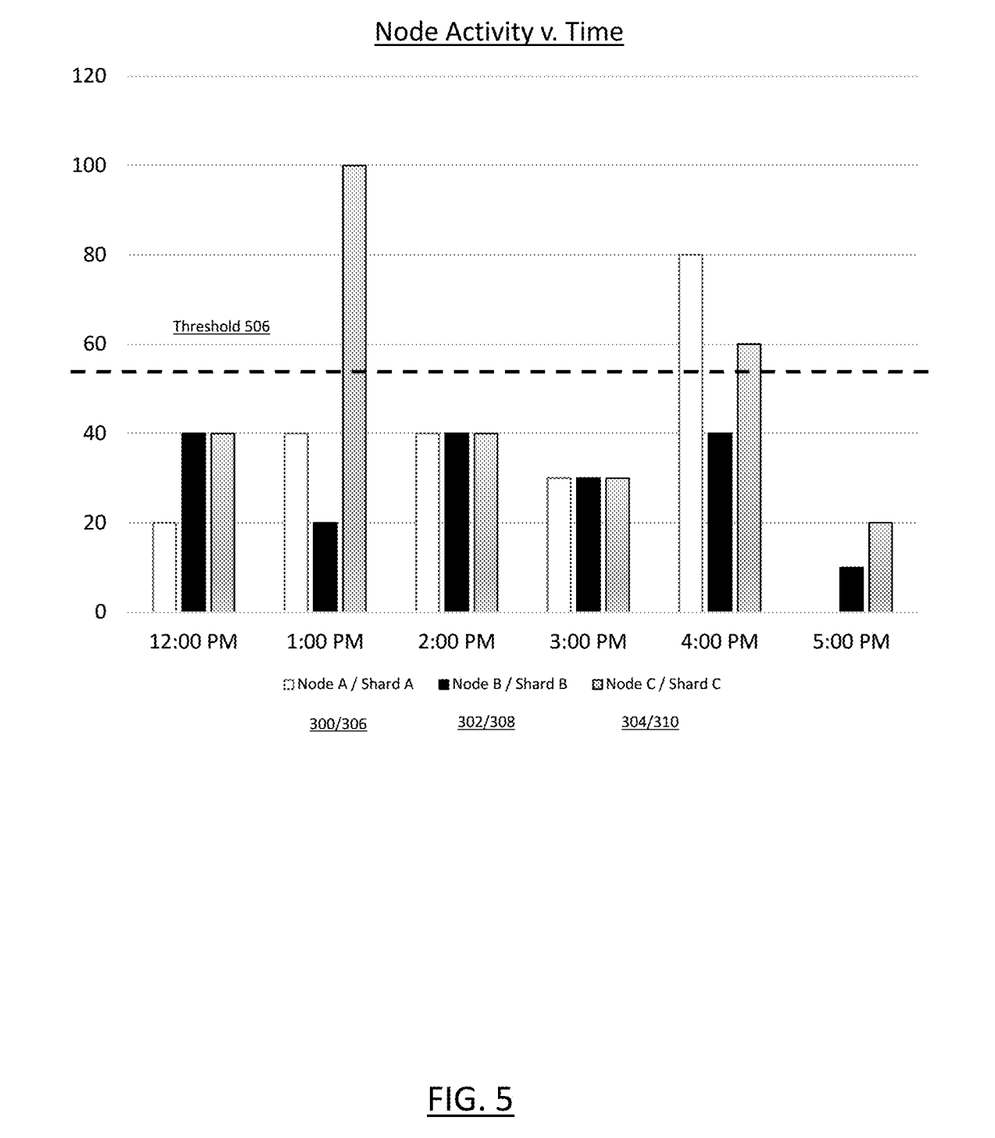
FIG. 5 illustrates a sample graphical comparison of various node activity against time intervals as well as a sample threshold in accordance with certain aspects of the present disclosure.
Figure 6:
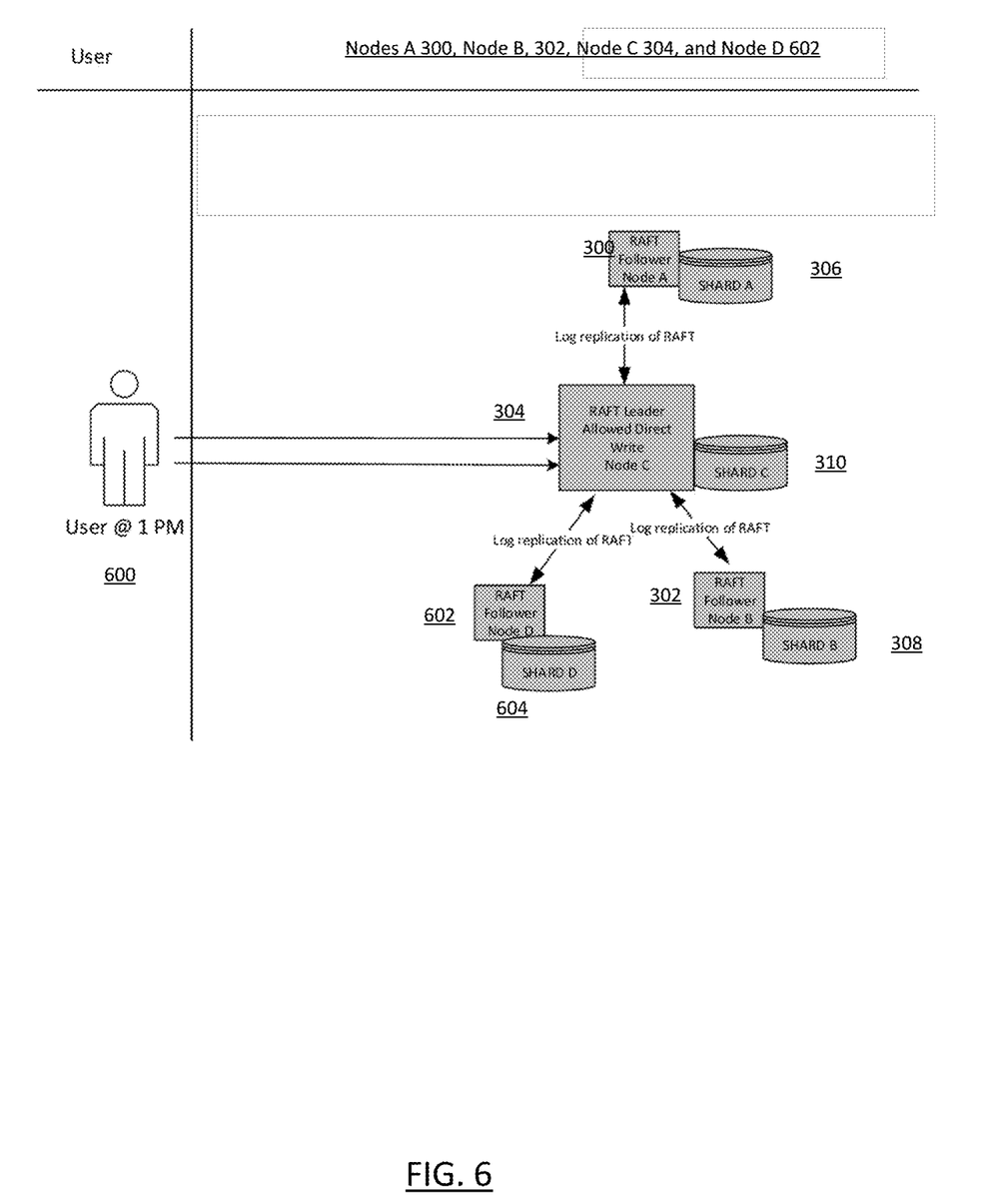
FIG. 6 shows an example of an implementation such as in FIG. 5 of a modified Raft consensus process with sharded data in accordance with certain aspects of the present disclosure.

FIG. 5 shows additional granular detail and depicts lower-level functionality of the artificial intelligence steps shown in the flow diagram of FIG. 3 in which feed forwarding and concatenation is performed in accordance with certain aspects of the present disclosure. In this example, metadata is input 500, characters are embedded 502, and bidirectional LSTM is performed 504 like corresponding actions in FIG. 4 of 400, 402, and 404.

However, instead of averaging the forward and backward contextualizations output from the bidirectional LSTM, they can be concatenated together 506. A feed forward layer can produce a dense layer result 508, which is then input into the softmax activation or the like function 510 in order generate such as in FIG. 4.

A person of skill in the art will recognize that the softmax function, also known as softargmax or normalized exponential function, is a generalization of the logistic function to multiple dimensions. It is used in multinomial logistic regression and is often used as the last activation function of a neural network to normalize the output of a network to a probability distribution over predicted output classes. The softmax function takes as input a vector z of K real numbers (such as the element-wise average 408 of FIG. 4 or the feed forward 508 of FIG. 5) and normalizes them into a probability distribution consisting of K probabilities proportional to the exponentials of the input numbers.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A domain-based server-selection method comprising the steps of:
   (a) providing a distributed data service operative based on a plurality of nodes in a domain, each of said plurality of nodes having a shard coupled thereto;
   (b) sharding data, based on temporal activity, across data stores coupled to the plurality of nodes;
   (c) determining one or more domain attributes for each of said plurality of nodes in the domain;
   (d) if at least one of said domain attributes exceeds a threshold:
      (i) nominating, by the plurality of nodes in the domain, at least one candidate node based on the domain attributes;
      (ii) electing, by the plurality of nodes in the domain, a leader node from the candidate nodes based on which of said plurality of nodes has a highest of said domain attributes;
      (iii) designating, each of said plurality of nodes in the domain other than the leader node as follower nodes;
      (iv) executing, by the leader node, leader transactions for a leader shard coupled to the leader node;
      (v) executing, by the follower nodes, follower transactions for follower shards coupled to the follower nodes; and
   (e) if none of said domain attributes exceeds the threshold, using a consensus selection process to vote on and select said leader node and designate said follower nodes.

2. The domain-based server-selection method of claim 1 in which the domain attributes are based on patterns of update data proximity.

3. The domain-based server-selection method of claim 2 in which a new leader is elected after expiration of a term.

4. The domain-based server-selection method of claim 3 in which the distributed data service is distributed database.

5. The domain-based server-selection method of claim 4 in which the plurality of nodes include processing nodes and data storage nodes.

6. The domain-based server-selection method of claim 5 in which the consensus selection process is a Raft consensus algorithm.

7. The domain-based server-selection method of claim 6 in which the leader node replicates its log to the follower nodes.

8. A domain-based server-selection non-transitory machine-readable medium storing one or more sequences of instructions, wherein execution of said one or more instructions by one or more processors contained in a system causes said system to perform the actions of:
   (a) providing a distributed data service operative based on a plurality of nodes in a domain;
   (b) sharding data, based on temporal activity, across data stores coupled to the plurality of nodes;
   (c) determining one or more domain attributes for each of said plurality of nodes in the domain;
   (d) if at least one of said domain attributes exceeds a threshold:
      (i) nominating, by the plurality of nodes in the domain, at least one candidate node based on the domain attributes;
      (ii) electing, by the plurality of nodes in the domain, a leader node from the candidate nodes based on which of said plurality of nodes has a highest of said domain attributes;
      (iii) designating, each of said plurality of nodes in the domain other than the leader node as follower nodes;
      (iv) executing, by the leader node, leader transactions for a leader shard coupled to the leader node;
      (v) executing, by the follower nodes, follower transactions for follower shards coupled to the follower nodes; and
   (e) if none of said domain attributes exceeds the threshold, using a consensus selection process to vote on and select said leader node and designate said follower nodes.

9. The domain-based server-selection non-transitory machine-readable medium of claim 8 in which the domain attributes are based on patterns of update data proximity.

10. The domain-based server-selection non-transitory machine-readable medium of claim 9 in which a new leader is elected after expiration of each term.

11. The domain-based server-selection non-transitory machine-readable medium of claim 10 in which the distributed data service is distributed database.

12. The domain-based server-selection non-transitory machine-readable medium of claim 11 in which the plurality of nodes include processing nodes and data storage nodes.

13. The domain-based server-selection non-transitory machine-readable medium of claim 12 in which the consensus selection process is a Raft consensus algorithm.

14. The domain-based server-selection non-transitory machine-readable medium of claim 13 in which the leader node replicates its log to the follower nodes.

15. A domain-based server-selection digital processing system comprising:
   (a) one or more processors; and
   (b) memory to store processor-executable instructions, wherein said one or more processors retrieve said instructions and execute said instructions, wherein execution of said instructions causes said digital processing system to perform the actions of:
      (i) providing a distributed data service operative based on a plurality of nodes in a domain;
      (ii) sharding data, based on temporal activity, across data stores coupled to the plurality of nodes;
      (iii) determining one or more domain attributes for each of said plurality of nodes in the domain;
      (iv) if at least one of said domain attributes exceeds a threshold:
         (1) nominating, by the plurality of nodes in the domain, at least one candidate node based on the domain attributes;
         (2) electing, by the plurality of nodes in the domain, a leader node from the candidate nodes based on which of said plurality of nodes has a highest of said domain attributes;
         (3) designating, each of said plurality of nodes in the domain other than the leader node as follower nodes;
         (4) executing, by the leader node, leader transactions for a leader shard coupled to the leader node;
         (5) executing, by the follower nodes, follower transactions for follower shards coupled to the follower nodes; and (v) if none of said domain attributes exceeds the threshold, using a consensus selection process to vote on and select said leader node and designate said follower nodes.

16. The domain-based server-selection digital processing system of claim 15 in which the domain attributes are based on based on patterns of update data proximity.

17. The domain-based server-selection digital processing system of claim 16 in which a new leader is elected after expiration of each term.

18. The domain-based server-selection digital processing system of claim 17 in which the distributed data service is distributed database.

19. The domain-based server-selection digital processing system of claim 18 in which the plurality of nodes include processing nodes and data storage nodes.

20. The domain-based server-selection digital processing system of claim 19 in which the consensus selection process is a Raft consensus algorithm.

* * * * *